June 27, 1961     R. E. GOULD     2,989,854
VEHICLE REFRIGERATION
Filed March 28, 1960
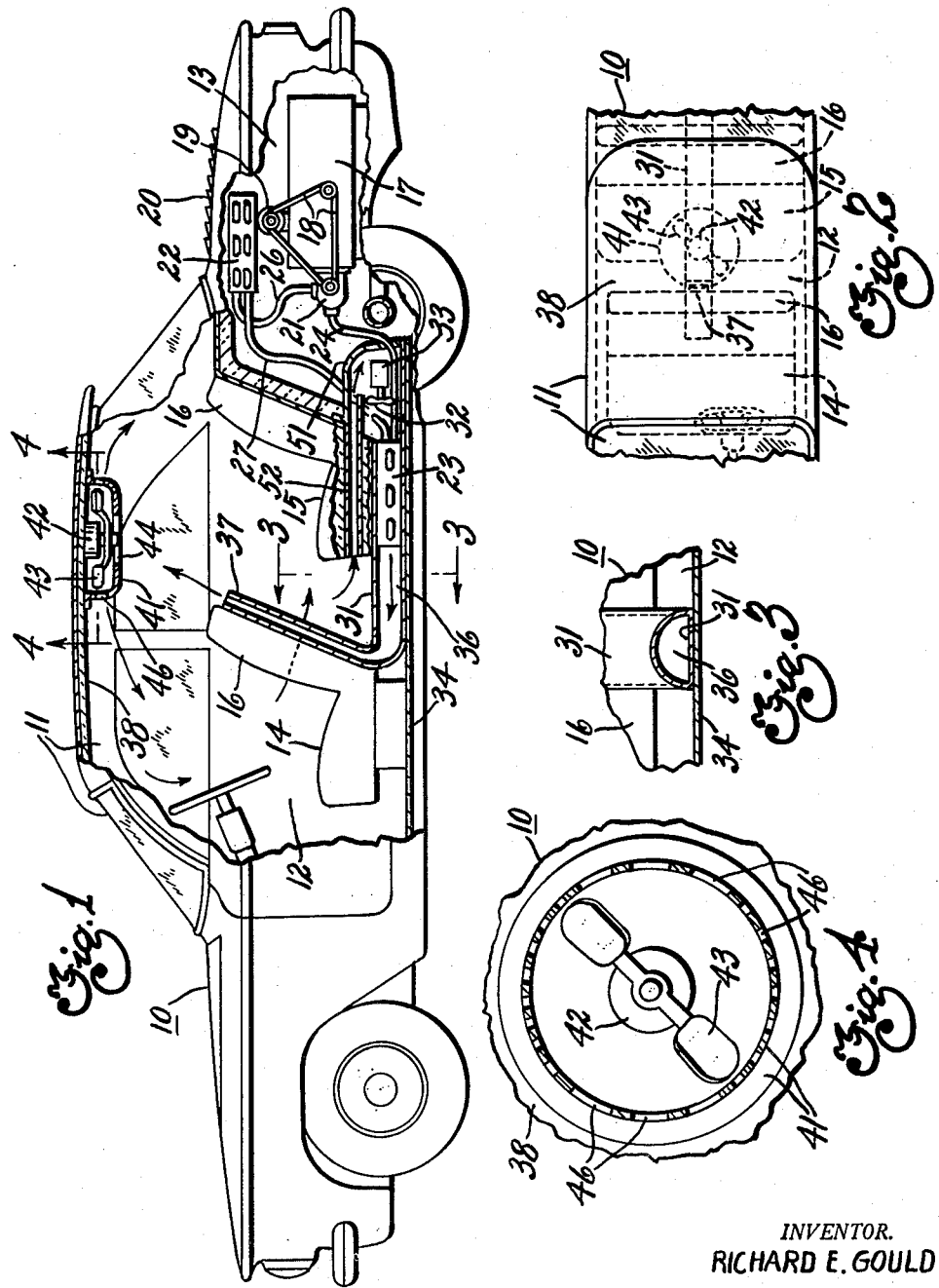
INVENTOR.
RICHARD E. GOULD
BY
Lloyd M. Keighley.
HIS ATTORNEY

United States Patent Office 2,989,854
Patented June 27, 1961

2,989,854
VEHICLE REFRIGERATION
Richard E. Gould, Dayton, Ohio, assignor to General Motors Corporation, Detroit, Mich., a corporation of Delaware
Filed Mar. 28, 1960, Ser. No. 18,127
7 Claims. (Cl. 62—243)

This invention relates to refrigeration and more particularly to an air cooling and conditioning arrangement for automobiles and the like.

The advent of domestic compact automobiles presents problems to manufacturers of refrigerating systems for application thereto in order to cool and condition air in the passenger compartment thereof. In particular, the compactness of such automobiles renders it difficult to find space in the passenger compartment to locate ducts or conduits therein for circulating air which will be in an out of the way location and devoid of forming objectionable obstructions within the compartment. Since the compact automobiles are cheaper than others, a simplified and correspondingly inexpensive arrangement must be available for cooling and circulating air within the passenger compartment thereof.

It is an object of my invention to provide an improved arrangement for cooling, circulating and distributing cool air within a passenger compartment of an automobile.

Another object of my invention is to provide a low cost yet effective and efficient air cooling and condition arrangement for the passenger compartment of a compact automobile.

In carrying out the foregoing objects, it is a further and more specific object of my invention to provide conduit means in a passenger compartment of an automobile which will discharge air, cooled by an evaporator of a refrigerating system carried by the automobile, in a single swift stream substantially at the center of the compartment intermediate its floor and ceiling out of direct contact with passengers therein and to employ means for withdrawing air from the stream thereof and circulating smaller streams of the cool air in a plurality of horizontal directions along the ceiling of the compartment so that upright walls of the compartment will alter flow of the cool air and then gently distribute it over and around seats in the compartment to condition the compartment and impart comfort to passengers therein.

Further objects and advantages of the present invention will be apparent from the following description, reference being had to the accompanying drawings wherein a preferred embodiment of the present invention is clearly shown.

In the drawings:

FIGURE 1 is a side view, partly in section and partly in elevation, of an automobile having my air cooling and circulating arrangement incorporated therein;

FIGURE 2 is a fragmentary top view of the automobile disclosed in FIGURE 1 on a reduced scale and shows the general location of elements of the air circulating arrangement;

FIGURE 3 is an enlarged fragmentary sectional view taken on the line 3—3 of FIGURE 1 of a portion of an air conveying conduit; and FIGURE 4 is an enlarged fragmentary sectional view taken on the line 4—4 of FIGURE 1 showing an air circulating means within a shroud.

Referring to the drawing, numeral 10 indicates a vehicle or automobile having walls 11 including windows defining a passenger compartment 12, a front storage or luggage compartment and a rear engine compartment 13, separate and isolated from compartment 12. The compartment 12 is provided with spaced apart front and rear seats 14 and 15 respectively extending transversely thereacross with a cushioned back 16 on each seat. Compartment 13 has an engine 17 mounted therein and operatively connected, in any suitable or conventional manner, to the rear wheels of vehicle 10 for propelling same. Engine 17 is preferably of the air cooled type which has a belt 18 driven thereby and operating a blower 19 to draw air into the engine compartment 13 through louvered or the like openings 20 provided in the engine compartment top wall which blower circulates the air over or through portions of the engine and out of compartment 13 in any suitable or conventional manner. Doors on either side of the body of automobile 10 provide access to the seats 14 and 15 by a driver and passengers. A refrigerating system or apparatus of an air cooling and conditioning arrangement is diagrammatically illustrated in FIGURE 1 and is carried by the automobile 10. This system includes a refrigerant translating device in the form of a refrigerant compressor 21 and condenser 22 and the system includes an evaporator 23 connected in refrigerant flow relationship with the compressor and condenser by pipes 24, 26 and 27. Compressor 21 is operated by the belt 18 from engine 17 and any suitable or conventional clutching mechanism, actuated by the driver of vehicle 10, may be employed between the compressor and its belt pulley to start and/or stop operation of the compressor as desired. When compressor 21 operates, it draws gaseous or evaporated refrigerant from evaporator 23, through pipe 24, to cause the evaporator to produce a refrigerating effect. Refrigerant compressed by compressor 21 is directed, by pipe 26, into condenser 22 which is cooled and liquefied therein by air drawn into engine compartment 13 by blower 19. The liquid refrigerant flows from condenser 22, through pipe 27, into evaporator 23 for reevaporization therein to continue the refrigerating effect produced thereby. The operation of compressor 21 together with the purpose of evaporator 23 of the refrigerating system are conventional in the art.

In accordance with my invention, I enclose evaporator 23 within an enlarged portion of conduit 31 and mount a first blower or fan means 32, connected to an electric motor 33, in this conduit preferably, although not necessarily, between the evaporator and an inlet end of the conduit. Conduit 31 extends forwardly of rear seat 15 along the floor 34 of vehicle 10 and forms an air passageway 36. The conduit 31 is centrally located with respect to the length of vehicle 10 (see FIGURE 2) and is bent up adjacent the rear of front seat 14 and flattened into a substantially rectangular shape in cross section extending upwardly along and behind the back 16 of seat 14. Conduit 31 is terminated slightly below the top of back 16 of front seat 14 in an open upwardly facing outlet end 37 disposed intermediate the floor 34 of passenger compartment 12 and its roof or ceiling 38. A perforated or screen-like cap may be secured over the outlet end 37 of conduit 31 if desired. A preferably circular one-piece shallow pan-like housing or shroud 41 is suspendingly mounted or secured to the ceiling 38 of compartment 12. Shroud 41 contains an electric motor 42 for operating a second fan means 43 connected thereto and located in the shroud. The shroud 41 has a central inlet opening 44 spaced above and substantially aligned with a swift single stream of air adapted to flow in an upright direction out of the outlet end 37 of conduit 31. Thus, opening 44 of shroud 41 is disposed in the path of a cool air stream leaving conduit 31. Circular side wall of shroud 41 is provided with a plurality of spaced apart aperture means or apertures 46 for a purpose to be hereinafter described. It will be noted (see FIGURE 4) that the apertures 46 in shroud 41 are of different size relative to one another and a greater amount of air is therefore circulated by fan means 43 out of the shroud toward the ends of elongated compartment 12. Housing or shroud 41 is constructed to depend only as far as necessary from ceiling 38 of compartment 12 whereby it will not, since it is located centrally within this compartment, obstruct head room of passengers seated therein. The inlet end of conduit 31 comprises or includes an upwardly curved metal piece 51 secured in place behind rear seat 15, in any suitable or conventional manner, and a duct means 52 projecting therefrom through the padded bottom of seat 15 to provide a return air passage therethrough communicating with passageway 36. The inlet end of conduit 31 is preferably in the center of rear seat 15 near or adjacent the lower portion of passenger compartment 12 where it will not ordinarily be obstructed when two passengers are seated on the rear seat of vehicle or automobile 10. A perforated or screen-like cover may be secured over the opening of return air duct means 52 if desired.

Assume that the automobile engine 17 is started, for propelling the vehicle 10, and it is desired to cool and condition air within passenger compartment 12 thereof. The driver of the vehicle actuates a conventional or well-known control or mechanism to clutch or connect compressor 21 with the driving belt 18 for operating the compressor to cause conduit coils and spaced apart fins on the evaporator 23 to be reduced in temperature. An electric circuit (not shown) leading from the battery of the vehicle to motors 33 and 42 is thereafter or simultaneously with the starting of compressor 21 closed to operate both fan means 32 and 43. Air within passenger compartment 12 of the automobile 10 is sucked into duct means 52 through the inlet end of conduit 31 and is forced by fan 32 over and around evaporator 23 within passageway 36 to cool or chill the air. Air cooled by evaporator 23 is circulated, by fan 32, forwardly in passageway 36 up through the portion of conduit 31 extending along the back 16 of front seat 14 out of the conduit in a swift moving substantially concentrated single upright stream from the upwardly facing outlet end 37 thereof toward the central inlet opening 44 of shroud 41. This stream of cooled air is within the central part of compartment 12 spaced from passengers on either side of the front and rear seats 14 and 15 so as not to flow directly into contact with them. Operation of fan means 43 picks up or withdraws air from the upright cooled air stream egressing from upwardly facing outlet end 37 of conduit 31 and sucks this cool air into shroud 41 by way of its central opening 44. Cooled air drawn into shroud 41 is circulated by fan 43 horizontally outwardly thereof in divided more gentle or slowly moving streams through the discharge apertures or aperture means 46 in a plurality of directions therefrom along and beneath ceiling 38 of compartment 12 of vehicle 10. The direction of the various streams of cooled air egressing from housing or shroud 41 is caused to be changed or altered by upright walls or windows 11 of automobile 10 and these walls direct the cool air circulated horizontally by fan 43 downwardly from the upper portion of compartment 12 in gentle streams over the seats 14 and 15 and consequently around passengers seated thereon. The circulating air cools the entire interior of compartment 12 in an effective and efficient manner and then flows around front seat 14 and from rear seat 15 into the inlet end 52 of conduit 31 to be recooled and recirculated as described. This precise or specific air circulation achieves a cooling result particularly in a passenger compartment of a compact vehicle without sharp blasts of cool air upon passengers therein and substantially devoid of drafts whereby the passengers are made comfortable in hot weather and less susceptible to catching a cold in an air conditioned automobile.

It should, from the foregoing, be apparent that I have provided an improved circulating system or arrangement for cooled air in a passenger compartment of an automobile. The arrangement is such that it can be applied to or installed in a relatively inexpensive compact vehicle or automobile at a minimum of cost to the owner thereof. While the air within the compartment of the vehicle is cooled and discharged in a swift moving or high velocity single stream from a conduit, it is thereafter broken up into a plurality of smaller slowly moving branch streams which, by virtue of walls of the compartment, are distributed throughout the compartment and gently flown over and around passengers therein. The present duct system and air circulating arrangement for a vehicle eliminates complaints of passengers thereof being subjected to cool rather sharp blasts of air and is therefore more practical in this respect.

While the embodiment of the present invention as herein disclosed, constitutes a preferred form, it is to be understood that other forms might be adopted.

What is claimed is as follows:

1. In a vehicle, an engine for propelling the vehicle, said vehicle having walls defining a passenger compartment therein provided with spaced apart front and rear seats extending transversely thereacross, a refrigerating system carried by said vehicle including a compressor, a condenser, an evaporator and refrigerant flow connections therebetween, said compressor being operated from said engine, a conduit extending along the floor of said compartment forwardly therein from the vicinity of said rear seat and thence upwardly along the back of said front seat, said conduit being provided with an inlet adjacent said compartment floor and an upwardly facing outlet end terminating behind said front seat intermediate said floor and the ceiling of said compartment, said evaporator being located within said forwardly extending part of said conduit, a first fan means between said conduit inlet and said evaporator therein for circulating air from said compartment into and through said conduit over the evaporator to cool the air and discharge same out of said outlet end of the conduit in an upright stream within the compartment, a single one-piece shroud in said compartment secured to said ceiling thereof having a central inlet opening spaced above said outlet end of said conduit and substantially aligned with the path of the cool air stream egressing therefrom, said shroud being in the form of a shallow pan-like structure for reducing to a minimum its pendency into said compartment, a second fan means within said shroud for drawing air thereinto through its inlet opening from said upright cool air stream, said shroud being provided with discharge apertures spaced from its said central inlet opening, and said second fan means circulating the cool air drawn into said shroud horizontally therefrom through said discharge apertures in a plurality of directions along the ceiling of said compartment whereby walls thereof alter the flow of the cool circulated air and direct same downwardly therein over said seats.

2. In a vehicle, walls defining a passenger compartment and an engine compartment separate from said passenger compartment disposed at the rear thereof, an engine mounted in said rear engine compartment for propelling said vehicle, spaced apart front and rear seats in said passenger compartment, a refrigerating system carried by said vehicle including a refrigerant translating device within said rear engine compartment, an evaporator associated with said passenger compartment and refrigerant flow connections between said device and said evaporator, a conduit enclosing said evaporator and extending therefrom upwardly along the back of said front seat, said conduit being provided with an upwardly facing outlet end terminating behind said front seat intermediate the floor of said compartment and its ceiling, a first fan means for circulating air from said passenger compartment into and through said conduit over said evaporator therein to cool the air and discharge same out of said outlet end of the conduit in an upright stream within the passenger compartment, a single one-piece shroud in said passenger compartment secured to said ceiling thereof having an inlet opening spaced above said outlet end of said conduit and substantially aligned with the path of the cool air stream egressing therefrom, said shroud being in the form of a shallow pan-like structure for reducing to a minimum its pendency into said compartment, a second fan means within said shroud for drawing air thereinto through its inlet opening from said cool air stream, said shroud being provided with discharge aperture means spaced from its said inlet opening, and said second fan means circulating the cool air drawn into said shroud horizontally therefrom through said discharge aperture means in a plurality of directions along the ceiling of said passenger compartment whereby walls thereof alter the flow of the cool circulated air and direct same downwardly therein over said seats.

3. In a vehicle, an engine for propelling the vehicle, said vehicle having walls defining a passenger compartment therein provided with spaced apart front and rear seats extending transversely thereacross, a refrigerating system carried by said vehicle including a compressor, a condenser, an evaporator and refrigerant flow connections therebetween, said compressor being operated from said engine, a conduit enclosing said evaporator and extending upwardly along the back of said front seat, said conduit being provided with an upwardly facing outlet end terminating behind said front seat intermediate the floor and the ceiling of said compartment, a first fan means for circulating air from a lower portion of said compartment into and through said conduit over said evaporator thereinto cool the air and discharge the cooled air out of said outlet end of the conduit in an upright stream within the compartment, a single one-piece shroud in said compartment secured to said ceiling thereof having a central inlet opening spaced above said outlet end of said conduit and substantially aligned with the path of the cool air stream egressing therefrom, said shroud being in the form of a shallow pan-like structure for reducing to a minimum its pendency into said compartment, a second fan means within said shroud for drawing air thereinto through its inlet opening from said upright cool air stream, said shroud being provided with discharge apertures in its sides spaced from said central inlet opening thereof, and said second fan means circulating the cool air drawn into said shroud horizontally therefrom through said discharge apertures in a plurality of directions along the ceiling of said compartment whereby walls thereof alter the flow of the cool circulated air and direct same downwardly therein over said seats.

4. In a vehicle having walls defining a passenger compartment therein provided with spaced apart front and rear seats extending transversely thereacross, a refrigerating system carried by said vehicle including a refrigerant translating device, an evaporator associated with said compartment and refrigerant flow connections between said device and said evaporator, a conduit having an inlet end located in the vicinity of said rear seat and extending forwardly thereof lengthwise of the vehicle along the floor of said compartment and thence upwardly along the back of said front seat near the center of the compartment, said evaporator being disposed in that part of said conduit extending along the floor of said compartment, said conduit being provided with an upwardly facing outlet end terminated below the top of the back of said front seat therebehind and intermediate the floor of said compartment and its ceiling, a first fan means in said part of said conduit for circulating air from the lower portion of said compartment into the conduit inlet end therethrough over said evaporator to cool the air and discharge same out of said conduit outlet end in an upright stream into the compartment, a circular single one-piece shroud in said compartment secured to said ceiling thereof having a central inlet opening spaced above said outlet end of said conduit and substantially aligned with the path of the cool air stream egressing therefrom, said shroud being in the form of a shallow pan-like structure for reducing to a minimum its pendency into said compartment, a second fan means within said shroud for drawing air thereinto through its inlet opening from said cool air stream, said shroud being provided with discharge apertures in its circular upright wall spaced from said inlet opening thereof, and said second fan means circulating the cool air drawn into said shroud horizontally therefrom through said discharge apertures in a plurality of directions around the shroud along the ceiling of said compartment whereby walls thereof alter the flow of the cool circulated air and direct same downwardly over said seats back to the inlet end of said conduit.

5. In a vehicle, walls defining a passenger compartment and an engine compartment separate from said passenger compartment disposed at the rear thereof, an engine mounted in said rear compartment for propelling said vehicle, spaced apart front and rear seats in said passenger compartment, a refrigerating system carried by said vehicle including a compressor, a condenser, an evaporator and refrigerant flow connections therebetween, said compressor being operated from said engine, a conduit having an inlet end located in the vicinity of said rear seat and extending forwardly thereof lengthwise of the vehicle along the floor of said passenger compartment and thence upwardly along the back of said front seat near the center of the passenger compartment, said evaporator being disposed in that part of said conduit extending along the floor of said passenger compartment adjacent said engine compartment, said conduit being provided with an upwardly facing outlet end terminated below the top of the back of said front seat therebehind and intermediate the floor of said passenger compartment and its ceiling, a first fan means in said part of said conduit for circulating air from the lower portion of said passenger compartment into the conduit inlet therethrough over said evaporator to cool the air and discharge same out of said upwardly facing conduit outlet end in an upright stream into the passenger compartment, a single one-piece shroud in said passenger compartment suspendingly secured to said ceiling thereof having an inlet opening spaced above said outlet end of said conduit and substantially aligned with the path of the cool air stream egressing therefrom, said shroud being in the form of a shallow pan-like structure for reducing to a minimum its pendency into said compartment, a second fan means within said shroud for drawing air thereinto through its inlet opening from said cool air stream, said shroud being provided with discharge apertures spaced from said inlet opening thereof, and said second fan means circulating the cool air drawn into said shroud horizontally therefrom through said discharge apertures in a plurality of directions along the ceiling of said passenger compartment whereby walls thereof alter the flow of the cool circulated air and direct same downwardly over said seats back to the inlet end of said conduit.

6. In a vehicle, an engine for propelling the vehicle, said vehicle having walls defining a passenger compartment therein provided with spaced apart front and rear seats, a refrigerating system carried by said vehicle including a compressor, a condenser, an evaporator and refrigerant flow connections therebetween, said compressor being operated from said engine, a conduit extending horizontally along the floor of said compartment from said rear seat continuously through the space intermediate said seats and thence upwardly along the back of said front seat, said conduit being provided with an inlet opening adjacent said compartment floor in the vicinity of said rear seat and an outlet end terminating behind said front seat between the floor and the ceiling of said compartment, said evaporator being located within said conduit, a first motor driven fan means for circulating air from said compartment into and through said conduit over said evaporator to cool the air and discharge same out of the outlet end of the conduit, said conduit outlet end being of such size as to concentrate and confine air egressing therefrom to an upright stream at the center of the back of said front seat spaced from two passengers adapted to be seated in side-by-side relationship on the front seat, a single one-piece shroud element in said compartment secured to said ceiling thereof and enclosing a motor driven second fan means only whereby to minimize the distance of downward dependency of said shroud element into the compartment, said single shroud element being provided with a central inlet opening spaced above said outlet end of said conduit and substantially aligned with the concentrated stream of cool air egressing therefrom, said single shroud element also being provided with discharge apertures spaced from its central inlet opening, said second fan means drawing air from said concentrated stream thereof into said inlet opening of said shroud element and forcefully expelling the air horizontally through said discharge apertures in all directions outwardly of the element toward upright walls of said compartment, and the upright walls of said compartment altering the flow of cool air forcibly discharged by said second fan means and directing same downwardly over said seats around and beyond said front seat in its return flow to said conduit inlet opening in the vicinity of said rear seat.

7. In a vehicle, an engine for propelling the vehicle, said vehicle having means defining an elongated passenger compartment therein provided with a floor, a ceiling, upright side walls and upright front and rear walls, spaced apart front and rear seats within said compartment, a refrigerating system carried by said vehicle including a compressor, a condenser, an evaporator and refrigerant flow connections therebetween, said compressor being operated from said engine, a conduit centrally of said elongated compartment extending horizontally along the floor thereof from said rear seat continuously through the space intermediate said seats and thence upwardly along the back of said front seat, said conduit being provided with a single inlet opening adjacent said compartment floor in the vicinity of said rear seat and an outlet end terminating behind said front seat between said floor and the ceiling of said compartment, said evaporator being located within said conduit, a first fan means in said conduit for circulating air from said compartment into and through the conduit over said evaporator to cool the air and discharge same out of the outlet end of the conduit in an upright stream confined to the middle portion only of the back of said front seat whereby to concentrate and space the stream between two passengers adapted to be seated in side-by-side relation on the front seat, a circular shroud in said compartment secured to the ceiling thereof having a central inlet opening spaced above said outlet end of said conduit and substantially aligned with the path of the cooled air stream egressing therefrom, a second fan means within said shroud for drawing air precooled by said evaporator thereinto through its central inlet opening, the sides of said circular shroud being provided with discharge apertures of different size relative to one another spaced from its central inlet opening, said second fan means circulating the precooled air drawn into said shroud horizontally therefrom, said discharge apertures of larger size opening in a direction paralleling the length of said elongated compartment and the discharge apertures of smaller size opening in a direction transverse to the length of said compartment whereby an increased amount of air is circulated by said second fan means out of said shroud toward the compartment front and rear walls above that circulated toward the long side walls thereof, and the upright walls of said compartment altering the horizontal circulation of cool air and directing same downwardly therein over said seats.

References Cited in the file of this patent
UNITED STATES PATENTS

| | | |
|---|---|---|
| 2,162,152 | Wulle | June 13, 1939 |
| 2,336,089 | Gould | Dec. 7, 1943 |
| 2,430,335 | Hart | Nov. 4, 1947 |
| 2,922,290 | Carraway | Jan. 26, 1960 |